(12) United States Patent
Hauge

(10) Patent No.: US 11,572,899 B2
(45) Date of Patent: Feb. 7, 2023

(54) PRESSURE EXCHANGER FOR HYDRAULIC FRACKING

(71) Applicant: ISOBARIC STRATEGIES INC., Riverside, CA (US)

(72) Inventor: Leif J. Hauge, Beaumont, CA (US)

(73) Assignee: Isobaric Strategies Inc., Riverside, CA (US)

( * ) Notice: Subject to any disclaimer, the term of this patent is extended or adjusted under 35 U.S.C. 154(b) by 89 days.

(21) Appl. No.: 17/169,840

(22) Filed: Feb. 8, 2021

(65) Prior Publication Data

US 2021/0254636 A1    Aug. 19, 2021

Related U.S. Application Data

(60) Provisional application No. 62/976,324, filed on Feb. 13, 2020.

(51) Int. Cl.
*F04F 13/00* (2009.01)
*E21B 43/267* (2006.01)
*E21B 43/26* (2006.01)

(52) U.S. Cl.
CPC .......... *F04F 13/00* (2013.01); *E21B 43/2607* (2020.05); *E21B 43/267* (2013.01)

(58) Field of Classification Search
CPC ..... F04F 13/00; E21B 43/267; E21B 43/2607
USPC .......................................................... 417/64
See application file for complete search history.

(56) References Cited

U.S. PATENT DOCUMENTS

| 2,675,173 A | | 4/1954 | George | |
| 2,898,866 A | | 8/1959 | Deackoff | |
| 3,095,704 A | * | 7/1963 | Spalding | F24D 3/00 60/39.45 |
| 3,234,736 A | | 2/1966 | Brian | |
| 3,874,166 A | * | 4/1975 | Kirchhofer | F04F 13/00 60/39.52 |

(Continued)

FOREIGN PATENT DOCUMENTS

| GB | 840408 | 7/1960 |
| SU | 1642096 | 4/1991 |

OTHER PUBLICATIONS

International Search Report and Written Opinion in International Appln. No. PCT/US2021/018003, dated Apr. 28, 2021, 20 pages.

(Continued)

*Primary Examiner* — Charles G Freay
(74) *Attorney, Agent, or Firm* — Fish & Richardson P.C.

(57) ABSTRACT

A pressure exchanger for hydraulic fracking includes a rotor that is configured to rotate about an axis and includes a plurality of rotor ducts extending parallel to the axis, where each rotor duct extends between a first side and a second side of the rotor that are spaced apart from each other. The pressure exchanger further includes a first end cover that is disposed at the first side of the rotor and defines a first pair of apertures configured to communicate a first fluid including fracking particles, and a second end cover that is disposed at the second side of the rotor and defines a second pair of apertures configured to communicate a second fluid. The first end cover further defines a flush port configured to supply the second fluid into the first side of the rotor in a state in which the first pair of apertures communicate the first fluid with the first side of the rotor.

11 Claims, 5 Drawing Sheets

(56) References Cited

U.S. PATENT DOCUMENTS

| | | | |
|---|---|---|---|
| 5,338,158 A | 8/1994 | Hauge | |
| 5,522,217 A * | 6/1996 | Zauner | F23R 3/56 60/39.45 |
| 9,604,889 B2 | 3/2017 | Arluck et al. | |
| 9,945,216 B2 | 4/2018 | Ghasripoor | |
| 10,125,796 B2 * | 11/2018 | Hauge | F04B 53/162 |
| 2006/0037895 A1 | 2/2006 | Shumway | |
| 2009/0104046 A1 | 4/2009 | Martin et al. | |
| 2010/0196152 A1 | 8/2010 | Pique et al. | |
| 2013/0037008 A1 | 2/2013 | Takamiya | |
| 2013/0121850 A1 | 5/2013 | Pinto et al. | |
| 2014/0128656 A1 | 5/2014 | Arluck et al. | |
| 2015/0096739 A1 | 4/2015 | Ghasripoor et al. | |
| 2016/0160890 A1 | 6/2016 | Anderson | |
| 2016/0222985 A1 | 8/2016 | Oklejas, Jr. | |
| 2017/0130743 A1 | 5/2017 | Anderson | |
| 2017/0335668 A1 * | 11/2017 | Ghasripoor | E21B 43/26 |
| 2017/0350428 A1 | 12/2017 | Martin et al. | |
| 2019/0278306 A1 | 9/2019 | Shampine | |
| 2019/0390576 A1 | 12/2019 | Thatte | |
| 2021/0246910 A1 | 8/2021 | Hauge | |
| 2021/0246912 A1 | 8/2021 | Hauge | |

OTHER PUBLICATIONS

International Search Report and Written Opinion in International Appln. No. PCT/US2021/018010, dated May 7, 2021, 18 pages.
International Search Report and Written Opinion in International Appln. No. PCT/US2021/018012, dated Apr. 6, 2021, 14 pages.
International Preliminary Report on Patentability in International Appln. No. PCT/US2021/018012, dated Aug. 25, 2022, 9 pages.
International Preliminary Report on Patentability in International Appln. No. PCT/US2021/018010, dated Aug. 25, 2022, 10 pages.
International Preliminary Report on Patentability in International Appln. No. PCT/US2021/018003, dated Mar. 23, 2022, 5 pages.

* cited by examiner

RELATED ART

RELATED ART

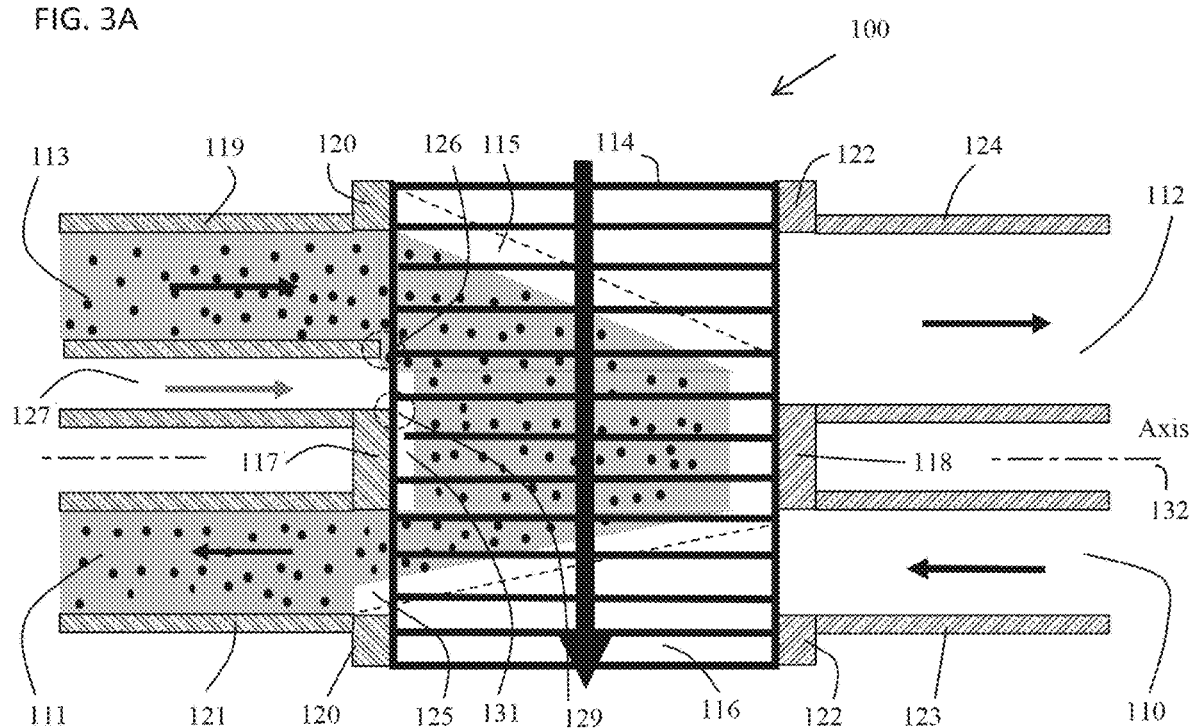

PRESSURE EXCHANGER FOR HYDRAULIC FRACKING

CROSS-REFERENCE TO RELATED APPLICATION

This application claims priority to U.S. Provisional Patent Application No. 62/976,324, filed on Feb. 13, 2020, the disclosures of which are incorporated herein by reference.

TECHNICAL FIELD

The present disclosure relates to a pressure exchanger, and more specifically, a pressure exchanger for hydraulic fracking that can reduce wear of an end cover and a rotor.

BACKGROUND

A pressure exchanger is a device that can exchange pressure energy between a high-pressure fluid stream and a low-pressure fluid stream. A common use for pressure exchangers is in Sea Water Reverse Osmosis (SWRO) desalination plants. The pressure exchanger can exchange pressure energy between a high pressure fluid stream and a low pressure fluid stream while separating the two fluid streams by a liquid barrier or interface formed in a rotor of the pressure exchanger. For instance, the liquid barrier or interface may be defined by a fluid volume remaining in the duct of the rotor (i.e., dead volume) of one or both of the streams. The pressure exchanger may use the remaining dead volume in the rotor as the separating interface or barrier to avoid excessive mixing of the two fluid streams in the rotor.

Hydraulic fracturing or fracking is a process to develop a well for gas or oil extraction by injecting fracking fluid including solid particles to bedrock. For example, a fracking process may involve injecting to rocks high pressure fluid (e.g., water) to form and increase fractures in the rocks and proppants such as sand or ceramic materials to prevent the collapse of fractures when pressure is removed. Generally, the fracking process may use positive displacement pumps having check valves to generate and supply the high pressure fracking fluid. However, the fracking particles included in the high pressure fluid may accelerate wear on the pumps and valves, and thus may increase cost for the fracking process and decrease the reduced life time of such components.

In some cases, a pressure exchanger may be used in a fracking process. For instance, the fracking process may include a pump that operates only on clean fluid without fracking particles and that provides the clean fluid to the pressure exchanger. The pressure exchanger may then transmit pressure energy of the clean fluid to fracking fluid including proppants, i.e., fracking particles. In some cases, the pressure exchanger may serve as a sacrificial item having far less cost than the pump. The pressure exchanger for the fracking process may be prone to the wear issues associated with an interference between the pressure exchanger and the proppants, which limits its operational cycle and commercial applicability.

In some cases, the pressure exchanger for a fracking operation may be made of a material having a high strength such as tungsten carbide. However, an end cover of the pressure exchanger may still interfere with the proppants in the fracking fluid. For example, the proppants may get crushed between a sealing area of the end cover and an edge of a rotor duct of the pressure exchanger. Therefore, the wear issues on the end cover and the rotor may still limit the commercial applicability of a pressure exchanger for fracking operations.

SUMMARY

The present disclosure describes a pressure exchanger for hydraulic fracturing or fracking that can help to prevent premature wear of the pressure exchanger. For example, the present disclosure describes improved structures and flow management techniques to supply a flush volume of clean fluid to one side of the pressure exchanger with fracking fluid to separate the fracking fluid from an end cover and a rotor of the pressure exchanger.

In some examples, the pressure exchanger according to the present disclosure can help to prevent or reduce wear on the rotor and the "dirty" end cover that communicates the fracking fluid. For example, the end cover may include a flush port connected to a low pressure port to provide clean fluid (e.g., water) to thereby flush or displace fracking fluid in the rotor such that the fracking fluid can be moved away from a sealing area of the end cover. The flush port can have a clearance gap greater than a size of the proppant particles to avoid crushing of the fracking particles with a wall that defines the flush port or the rotor.

According to one aspect of the subject matter described in this application, a pressure exchanger for hydraulic fracking includes a rotor that is configured to rotate about an axis and includes a plurality of rotor ducts extending parallel to the axis, where each rotor duct extends between a first side and a second side of the rotor that are spaced apart from each other. The pressure exchanger further includes a first end cover that is disposed at the first side of the rotor and defines a first pair of apertures configured to communicate a first fluid including fracking particles, and a second end cover that is disposed at the second side of the rotor and defines a second pair of apertures configured to communicate a second fluid. The first end cover further defines a flush port configured to supply the second fluid into the first side of the rotor in a state in which the first pair of apertures communicate the first fluid with the first side of the rotor.

Implementations according to this aspect can include one or more of the following features. For example, the flush port can be spaced apart from the first side of the rotor and defines a clearance gap between the first side of the rotor and an end of the flush port facing the first side of the rotor. In some examples, a size of the clearance gap is greater than the greatest size of the fracking particles. In some examples, the first end cover can include a sealing area that faces the first side of the rotor and that is disposed between the first pair of apertures, where the axis passes through the sealing area. The flush port can be defined between the sealing area and one of the first pair of apertures, where the flush port is in communication with the one of the first pair of apertures. In some implementations, the flush port can be configured to supply the second fluid into the first side of the rotor such that the second fluid separates the first fluid from the sealing area.

In some implementations, the first pair of apertures can include (i) a low pressure inlet configured to introduce, to the rotor, the first fluid having a first low pressure, where the low pressure inlet is in communication with the flush port, and (ii) a high pressure outlet configured to discharge, from the rotor, the first fluid having a first high pressure greater than the first low pressure. The second pair of apertures can include (i) a high pressure inlet that faces the high pressure outlet and that is configured to introduce, to the rotor, where the second fluid having a second high pressure, and (ii) a low pressure outlet that faces the low pressure inlet and that is configured to discharge, from the rotor, the second fluid having a second low pressure less than the second high pressure.

In some implementations, the first end cover can include a center sealing area that is disposed between the low pressure inlet and the high pressure outlet and that faces a center portion of the first side of the rotor, where the axis passes through the center sealing area, and an outer sealing area that faces an outer portion of the first side of the rotor, the outer sealing area facing each of the high pressure inlet and the low pressure outlet. The flush port can be defined between the center sealing area and the low pressure inlet, and the flush port can be configured to supply the second fluid into the first side of the rotor such that the second fluid separates the first fluid from the center sealing area.

In some examples, the high pressure inlet can be configured to supply at least a portion of the second fluid to the high pressure outlet through the rotor such that the second fluid separates the first fluid from the outer sealing area. In some examples, the high pressure outlet can be configured to receive (i) a first volume of the first fluid from the low pressure inlet and (ii) a second volume of the second fluid from the high pressure inlet, the second volume being less than the first volume.

In some implementations, the rotor can be configured to, in a state in which the flush port supplies the second fluid into the first side of the rotor, supply an additional flush volume of the second fluid from the high pressure inlet to the high pressure outlet through an outer portion of the plurality of rotor ducts. The additional flush volume can be less than a volume of the first fluid discharged through the high pressure outlet.

In some implementations, the rotor has a low pressure side and a high pressure side, where the axis passes through an area between the low pressure side and the high pressure side. One of the first pair of apertures and the flush port can be defined at the low pressure side, and the other of the first pair of apertures can be defined at the high pressure side. In addition, one of the second pair of apertures can be defined at the low pressure side and faces each of the flush port and the one of the first pair of apertures, where a cross-sectional area of the one of the second pair of apertures defined at the low pressure side is greater than a cross-sectional area of the other of the second pair of apertures defined at the high pressure side.

According to another aspect, a system for hydraulic fracking includes a pressure exchanger including a rotor that is configured to rotate about an axis and that defines a plurality of rotor ducts extending parallel to the axis, where each rotor duct extends between a first side and a second side of the rotor that are spaced apart from each other. The system further includes a blender configured to generate a first fluid including fracking particles and to supply the first fluid to the first side of the rotor, and a tank configured to receive a second fluid and to supply a first portion of the second fluid to the first side of the rotor and a second portion of the second fluid to the second side of the rotor. A first flow rate of the first portion of the second fluid is less than a second flow rate of the second portion of the second fluid.

Implementations according to this aspect can include one or more of the following features or the features of the pressure exchanger described above. For instance, the pressure exchanger can further include a first end cover disposed at the first side of the rotor, where the first end cover defines a first pair of apertures configured to communicate the first fluid including the fracking particles, and a flush port configured to receive the first portion of the second fluid in a state in which the first pair of apertures communicate the first fluid with the first side of the rotor. The pressure exchanger can further includes a second end cover disposed at the second side of the rotor, where the second end cover defines a second pair of apertures configured to communicate the second fluid.

In some implementations, the system can further include (i) a feed pump that is disposed between the tank and the pressure exchanger and that is configured to receive the second fluid from the tank and increase a pressure of the second fluid, and (ii) a branch pipe that is connected to the feed pump and the pressure exchanger and that is configured to divide the second fluid received from the feed pump into the first portion and the second portion of the second fluid. In some examples, the system can further include a high-pressure pump that is disposed between the feed pump and the pressure exchanger and that is configured to receive the second portion of the second fluid from the feed pump. The high-pressure pump can be configured to increase a pressure of the second portion of the second fluid and supply the second portion of the second fluid to the second side of the pressure exchanger, where the branch pipe is disposed between the feed pump and the high-pressure pump.

In some implementations, the first pair of apertures can include (i) a low pressure inlet configured to introduce, from the blender to the rotor, the first fluid having a first low pressure, where the low pressure inlet is in communication with the flush port, and (ii) a high pressure outlet configured to discharge, from the rotor, the first fluid having a first high pressure greater than the first low pressure. The second pair of apertures can include (i) a high pressure inlet that faces the high pressure outlet and that is configured to introduce, from the high-pressure pump to the rotor, where the second fluid has a second high pressure, and (ii) a low pressure outlet that faces the low pressure inlet and that is configured to discharge, from the rotor to the tank, the second fluid having a second low pressure less than the second high pressure.

In some implementations, the system can further includes a connector that is disposed between the low pressure outlet and the tank and that is configured to receive the second fluid from the low pressure outlet. The connector can be configured to divide the second fluid from the low pressure outlet into a third portion and a fourth portion and to supply the third and fourth portions of the second fluid to the tank and the blender, respectively, where a third flow rate of the third portion of the second fluid is less than a fourth flow rate of the fourth portion of the second fluid.

In some examples, the third flow rate of the second fluid supplied to the tank is greater than the first flow rate of the second fluid supplied to the first side of the rotor, and the fourth flow rate of the second fluid supplied to the blender is less than the second flow rate of the second fluid supplied to the second side of the rotor.

In some implementations, the flush port can be configured to supply the second fluid into the first side of the rotor such that the second fluid separates the first fluid from a center portion of the first end cover, where the high pressure inlet is configured to supply at least a portion of the second portion of the second fluid to the high pressure outlet through the rotor such that the second fluid separates the first fluid from an outer portion of the first end cover. In some examples, the rotor can be configured to, in a state in which the flush port supplies the second fluid into the first side of the rotor, supply an additional flush volume of the second fluid from the high pressure inlet to the high pressure outlet through an outer portion of the plurality of rotor ducts. The additional flush volume can be less than a volume of the first fluid discharged through the high pressure outlet.

BRIEF DESCRIPTION OF THE DRAWINGS

FIG. 3A is a circular cross-sectional view showing an example of a pressure exchanger for hydraulic fracking according to the present disclosure.

Like reference symbols in the various drawings indicate like elements.

DETAILED DESCRIPTION

One or more implementations of the present disclosure will be described below. These described implementations are only exemplary of the present disclosure. As discussed in detail below, the described implementations relate generally to hydraulic processing, and particularly to a fracking plant that uses a pressure exchanger to increase pressure of fracking fluid including solid particles. In some implementations, the pressure exchanger can be applicable to processes that transport slurry, ore, and corrosive or erosive fluids.

Figure 1:
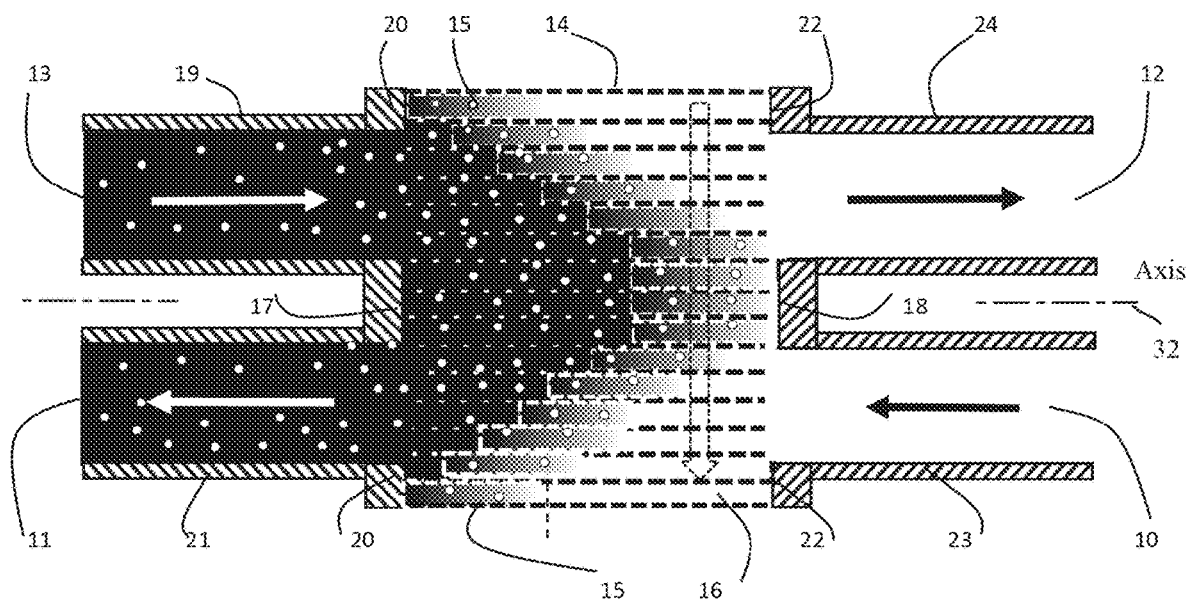
FIG. 1 is a circular cross-sectional view showing an example of a pressure exchanger for a fracking process in related art.

FIG. 1 is a circular cross-sectional view showing an example of a pressure exchanger used in a fracking operation in related art.

The pressure exchanger receives and discharges fracking fluid, which is depicted as black in FIG. 1. The fracking fluid includes proppants particles, which are depicted as white dots in the fracking fluid. The pressure exchanger includes a rotor 14, a first end cover 20 located at a first side (e.g., the left side in FIG. 1) of the rotor 14, and a second end cover 22 located at a second side (e.g., the right side in FIG. 1) of the rotor 14.

The rotor 14 can rotate about an axis 32 that extends through the rotor 14. The end covers 20 and 22 may include central sealing areas 17 and 18 that are disposed at central areas of the end covers, respectively. In addition, outer portions of the end covers 20 and 22 may be referred to as outer sealing areas that face and contact sides of outer portions of the rotor 14. For example, the outer portions are disposed radially outward relative to central areas of the end covers 20 and 22. The rotor 14 may include multiple rotor ducts 16 that extend through an inside of the rotor 14 along the axis 32 extending through the sealing areas 17 and 18. The rotor 14 may have a high-pressure side (e.g., lower side in FIG. 1) and a low-pressure side (e.g., upper side in FIG. 1) with respect to the axis 32 and configured to rotate about the axis 32.

The first side of the rotor 14, which faces the first end cover 20, may receive and discharge the fracking fluid. The second side of the rotor 14, which faces the second end cover 22, may receive and discharge clean fluid (e.g., water) without the proppants. The rotor ducts 16 may define a dead volume 15 that acts as a separating barrier between the fracking fluid and the clean fluid. The dead volume 15 may move back and forth along the rotor ducts 16 for each revolution of the rotor 14. The dead volume 15 or barrier may have a gradual concentration of the proppants. For instance, the dead volume 15 may define a concentration gradient between a first concentration at one side facing the first end cover 20 and a second concentration at the other side facing the second end cover 22. The first concentration may be equal to a concentration of the fracking fluid, and the second concentration may be virtually zero as facing the clean water side.

The pressure exchanger may receive a low pressure fracking fluid stream 13 through a low pressure inlet port 19 that is connected to the first end cover 20 and configured to receive the fracking fluid. The pressure exchanger may discharge a high pressure fracking fluid stream 11 through a high pressure outlet port 21 that is connected to the first end cover 20. The high pressure outlet port 21 may be configured to discharge the fracking fluid that has passed at least a portion of the rotor ducts 16.

The pressure exchanger may also include a high pressure inlet port 23 connected to the second end cover 22 and configured to receive a high pressure clean water stream 10, and a low pressure outlet port 24 connected to the second end cover 22 and configured to discharge a low pressure clean water stream 12. The high pressure inlet port 23 and the high pressure outlet port 21 are disposed at the high-pressure side of the pressure exchanger with respect to the axis 32, and the low pressure inlet port 19 and the low pressure outlet port 24 are disposed at the low-pressure side of the pressure exchanger with respect to the axis 32.

On the high-pressure side of the pressure exchanger, the high pressure clean water stream 10 enters the high pressure inlet port 23 and pushes onto the dead volume 15 to thereby gradually displace the fracking fluid stream 11 through the high pressure outlet port 21. The high pressure clean water stream 10 may move through some of the rotor ducts 16 from the end cover 22 to the outer sealing area of the end cover 20, where the proppant particles in the fracking fluid or the dead volume 15 may be randomly crushed due to the extremely tight clearance between the end cover 20 and the rotor 14. Thus, the end cover 20 and the rotor 14 at the high-pressure side may suffer from an accelerated cavitation damage or impact damage due to the crushing of the proppant particles.

On the low-pressure side of the pressure exchanger, the low pressure fracking fluid stream 13 enters the low pressure inlet port 19 and pushes onto the dead volume 15 to thereby gradually displace the low pressure clean water stream 12 through the low pressure outlet port 24. The low pressure fracking fluid stream 13 may move through some of the rotor ducts 16 from the end cover 20 to the central sealing area 18 of the end cover 22.

The low-pressure side of the pressure exchanger may also suffer from wear problems when the clean water and the dead volume 15 in the rotor ducts 16 are depressurized after passing the outer sealing area of the end cover 20. For example, the low pressure fracking fluid stream 13 introduced through the low pressure inlet port 19 may pass the sealing area 17 based on rotation of the rotor 14. In order to transfer the fracking fluid from the low-pressure side (e.g., low pressure fracking fluid stream 13) to the high-pressure side (e.g., high pressure fracking fluid stream 11), a portion of the rotor ducts 16 may cross the sealing area 17. In this case, a portion of the proppant particles in the fracking fluid may be randomly crushed on edges of the sealing area 17 due to a narrow clearance or gap between the end cover 20 and ends of the rotor ducts 16 facing the sealing area 17. On the other hand, the end cover 22 may not have similar wear problems because the dead volume 15 blocks the fracking particles from being transferred to the low pressure clean water stream 12. That is, the clean water can pass both the central sealing area 18 and outer sealing area of the end cover 22 without any crushing damage due to the fracking particles.

Figure 2:
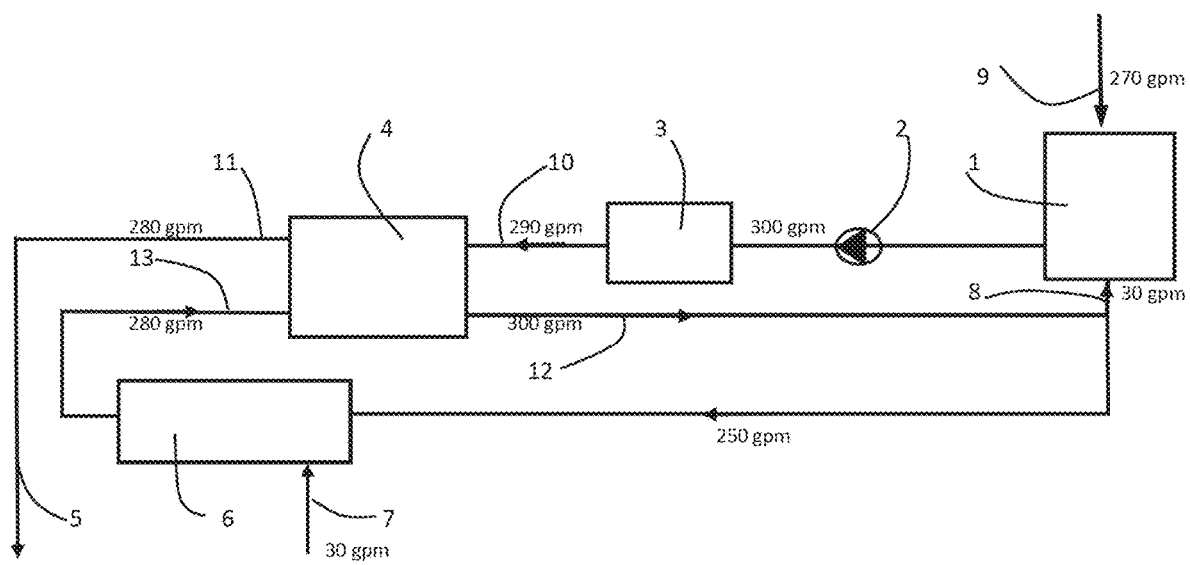
FIG. 2 is a block diagram showing an example system for hydraulic fracking using a pressure exchanger in related art.

FIG. 2 is a block diagram showing an example system for hydraulic fracking using a pressure exchanger in related art. A pressure exchanger 4 may have the same structure as the pressure exchanger described above with FIG. 1. For example, the pressure exchanger 4 may receive a high pressure clean water stream 10 and a low pressure fracking fluid stream 13, and discharge a low pressure clean water stream 12 and a high pressure fracking fluid stream 11. In some case, in the example system shown in FIG. 2, the pressure exchanger 4 may operate to output 280 gallon per minute ("gpm") of the high pressure fracking fluid stream 11. The fracking fluid output from the pressure exchanger 4 may be guide by a pipe 5 and used to develop an oil or gas well. The output flow rates of the pressure exchanger 4 in FIG. 2, e.g., 280 gpm and 300 gpm, are just examples for explanation of the system, and the output flow rates may vary in other examples.

The system may further include a water tank 1 configured to receive water, a feed pump 2 connected to the water tank 1, a high-pressure pump 3 connected to the feed pump 2 and configured to supply the water to the pressure exchanger 4, and a blender 6 configured to supply the fracking fluid stream 13 to the pressure exchanger 4.

Referring to the example shown in FIG. 2, the water tank 1 may receive (i) 270 gpm of water from an external water supply through a feed line 9 and (ii) 30 gpm of water from the pressure exchanger 4 through another feed line 8. The water tank 1 may deliver an outflow of water with 300 gpm via the feed pump 2 to the high-pressure pump 3. The high-pressure pump 3 may operate at a relatively high pressure, for example, 15,000 pound per square inch ("psi"), and discharge water with a less flow rate (e.g., 290 gpm) due to volumetric compression under the high pressure. The high-pressure pump 3 may supply the high pressure clean water stream 10 to the pressure exchanger 4.

The blender 6 may receive some of the low pressure clean water stream 12 from the pressure exchanger 4 and proppant particles or fracking chemicals through a feed line 7 to generate the fracking fluid. For example, the blender 6 may receive 250 gpm of water and 30 gpm of proppants, and discharge about 280 gpm of the low pressure fracking fluid stream 13 to the pressure exchanger 4. The flow rate 30 gpm of the proppants or fracking chemicals supplied into the blender 6 may be equal to the flow rate of water fed back to the water tank 1.

In some cases, the input flow rate and the output flow rate of the pressure exchanger 4 may not exactly match each other due to compression of fluid or integral leakage of water in the pressure exchanger 4. For example, the pressure exchanger 4 may need to receive more fracking fluid or water than a target output flow rate (e.g., 280 gpm) considering loss of water due to the internal leakage. In some cases, the leakage water may be discharged with the low pressure clean water stream 12. For instance, FIG. 2 illustrates an increase of the output flow rate of the high pressure clean water stream 10 from the input flow rate 290 gpm to the output flow rate 300 gpm of the low pressure clean water stream 12.

FIG. 3A is a circular cross-sectional view showing an example of a pressure exchanger for hydraulic fracking according to the present disclosure.

For example, a pressure exchanger 100 is configured to receive and discharge fracking fluid depicted as gray in FIG. 3A. The fracking fluid includes proppants particles depicted as black dots in the fracking fluid in FIG. 3A. The pressure exchanger 100 includes a rotor 114, a first end cover 120 located at a first side (e.g., the left side in FIG. 3A) of the rotor 114, and a second end cover 122 located at a second side (e.g., the right side in FIG. 3A) of the rotor 114.

The rotor 114 can rotate about an axis 132 that extends through the rotor 114. For example, the rotor 114 may mechanically rotate about a shaft that extends along the axis 132. In some cases, the shaft may be rotated by a driving device such as a motor. In some implementations, the rotor 114 (or the shaft of the rotor 114) can be configured to rotate by a flow entering to the rotor 114. For instance, the pressure exchanger 100 can further include a ramp structure that includes an inclined surface with respect to the axis 132. The inclined surface of the ramp structure can be configured to face and contact incoming flow streams (e.g., fluid stream 110 (e.g., high pressure clean water stream 110) or fluid stream 113 (e.g., low pressure fracking fluid stream 113)). Based on pressure of the incoming flow streams applied to the inclined surface of the ramp structure, the rotor 114 can rotate about the shaft relative to the end covers 120 and 122.

In some implementations, a rotation speed of the rotor 114 can be determined based on the arrangement of the incline surface of the ramp structure. For example, the rotation speed of the rotor 114 may be determined based on increasing or decreasing an inclined angle of the incline surface with respect to the axis 132. In some examples, the rotation speed of the rotor 114 may be determined based on increasing or decreasing an area or a number of the incline surfaces arranged in the ramp structure. In some examples, the rotation speed of the rotor 114 may vary based on a pattern of the inclined surface of the ramp structure.

Alternatively or in addition, the rotation speed of the rotor 114 can be controlled by adjusting a flow rate or pressure of the incoming streams. For example, the rotation speed of the rotor 114 can be increased based on an increase of the flow rate of the incoming fluid stream 110. The rotation speed of the rotor 114 can be decreased based on a decrease of the flow rate of the incoming fluid stream 110. In this example, the rotation speed of the rotor 114 may depend on the flow rate of the incoming fluid stream 110.

In some implementations, the rotation speed of the rotor 114 can be controlled independent of the flow rate of the incoming fluid stream 110. For example, the rotor 114 can be rotated by a separate driving device such as a motor. In another example, one or more components of the pressure exchanger 100 may be replaced to adjust the rotation speed of the rotor 114 while keeping the same flow rate of the incoming fluid stream 110. In particular, the end cover 122, the end cover 120, rotor 114, or the ramp structure of the rotor 114 having the inclined surface can be replaced to adjust the rotation speed of the rotor 114. In some examples, the end cover 122 and the end cover 120 may include the ramp structure having the inclined surface.

The end covers 120 and 122 may include central sealing areas 17 and 18 that are disposed at central areas of the end covers, respectively. The central sealing area 17 may be spaced apart by a minimal clearance from a first side of the rotor 114 to provide tight sealing between the end cover 120 and central portions of rotor ducts 116 to block passage or leakage of the fracking fluid between the end cover 120 and the central portions of rotor ducts 116. In some examples, the central sealing area 17 may be in contact with the first side of the rotor 114 to block the passage or leakage of the fracking fluid.

In addition, outer portions of the end covers 120 and 122 may be referred to as outer sealing areas that face side surfaces of outer portions of the rotor 14. The outer sealing areas are disposed radially outside of the central areas of the end covers 120 and 122. In some examples, the outer sealing area of the end cover 120 may be spaced apart by a minimal clearance from the first side of the rotor 114 to provide tight sealing between the end cover 120 and an outer portions of rotor ducts 116. That is, in some cases, the outer sealing area of the end cover 120 may provide a tight sealing clearance between the end cover 120 and the outer portions of rotor ducts 116 to block passage or leakage of the fracking fluid between the end cover 120 and the outer portions of rotor ducts 116. In some cases, the outer sealing areas of the end cover 120 may be in contact with the first side of the rotor 114 to block passage or leakage of the fracking fluid.

The rotor 114 may include multiple rotor ducts 116 that extend through an inside of the rotor 114 along the axis 132 extending through the sealing areas 117 and 118. The rotor 114 may have a high-pressure side (e.g., the lower side in FIG. 3A) and a low-pressure side (e.g., the upper side in FIG. 3A) with respect to the axis 132, and the rotor 114 is configured to rotate about the axis 132.

The first side of the rotor 114 may face the first end cover 120 that includes a pair of apertures configured to communicate first fluid or fracking fluid including fracking particles. For instance, the first fluid may include proppants including solid particles such as sand, chemicals, etc., for a fracking operation. The second side of the rotor 114 may faces the second end cover 122 including a second pair of apertures that are configured to communicate second fluid or clean fluid (e.g., water) without proppants.

In some implementations, the first end cover 120 can further define a flush port (e.g., hole or aperture) that is configured to supply the second fluid into the first side of the rotor 114 in a state in which the first pair of apertures of the first end cover 120 communicate the first fluid with the first side of the rotor 114. In some cases, the flush port may refer to a pipe 127. In some cases, the flush port can be connected to a flush inlet duct or pipe 127 configured to supply a flush volume of clean water to the first side of the rotor 114 while the first pair of apertures of the first end cover 120 communicate the first fluid with the first side of the rotor 114.

In some examples, the flush port or flush inlet duct 127 is spaced apart from the first side of the rotor 114 and defines a clearance gap 126 between a first end (e.g., a radially outer end) of the flush inlet duct 127 and the first side of the rotor 114. For instance, the first end of the flush inlet duct 127 may be in communication with one of the first pair of apertures of the end cover 120 through the clearance gap 126. In some cases, a size of the clearance gap 126 may be greater than a size of the fracking particles such that the fracking particles can pass the flush port without being crushed. For example, the size of the clearance gap 126 can be greater than a maximum size (i.e., the greatest size) of the fracking particles.

A second end (e.g., a radially inner end) of the flush port or flush inlet duct 127 may define a tight clearance 129 with the first side of the rotor 114. For example, the tight clearance 129 may be narrower than the clearance gap 126. In some examples, the second end the flush inlet duct 127 may be connected to and in contact with an outer side of the center sealing area 117, and an inner side of the center sealing area 117 defines the tight clearance 129 with the first side of the rotor 114. The flush inlet duct 127 can be configured to supply the second fluid into the first side of the rotor 114 to push the first fluid toward the second side of the rotor 114 such that the first fluid moves to be separated from the center sealing area 117. As such, the flush volume supplied through the flush inlet duct 127 can reduce wear on the end cover 120 by eliminating or reducing occurrences of a contact between the fracking particle and the center sealing area 117.

The rotor ducts 116 may define a dead volume 115 that acts as a separating barrier between the fracking fluid and the clean fluid. The dead volume 115 may move back and forth along the rotor ducts 116 for each revolution of the rotor 114. The dead volume 115 or barrier may have a gradual concentration of the proppants. For instance, the dead volume 115 may define a concentration gradient between a first concentration at one side facing the first end cover 120 and a second concentration at the other side facing the second end cover 122. The first concentration may be equal to a concentration of the fracking fluid, and the second concentration may be virtually zero as facing the clean water side.

In some implementations, where the flush inlet duct 127 is connected to one of the first pair of apertures of the end cover 120 to supply the flush volume, the rotor 114 may define the dead volume 115 having the concentration gradient that is asymmetric with respect to the axis 132. For example, a first cross-section area of the dead volume 115, which faces the incoming fracking fluid, may be greater than a second cross-section area of the dead volume 115, which faces the outgoing fracking fluid. The asymmetry of the dead volume 115 may depend upon the flush volume.

The pressure exchanger 100 can include a low pressure inlet port or duct 119 connected to the first end cover 120 and configured to receive a fracking fluid stream 113, and a high pressure outlet port or duct 121 connected to the first end cover 120 and configured to discharge a fracking fluid stream 111 that has passed at least a portion of the rotor ducts 116. For instance, each of the low pressure inlet port 119 and the high pressure outlet port 121 may include a pipe, a tube, a connector, or the like. The low pressure inlet port 119 may be in communication with the flush port 127 through the clearance gap 126 as discussed above.

The pressure exchanger 100 can also include a high pressure inlet port or duct 123 connected to the second end cover 122 and configured to receive a high pressure clean water stream 110, and a low pressure outlet port or duct 124 connected to the second end cover 122 and configured to discharge a clean water stream 112. For instance, each of the high pressure inlet port 123 and the low pressure outlet port 124 may include a pipe, a tube, a connector, or the like. The pressure exchanger 100 may be configured to transmit pressure energy of the high pressure clean water stream 110 received through the high pressure inlet port 123 to the fracking fluid stream 113 received through the low pressure inlet port 119. For instance, a pressure of the outgoing fracking fluid stream 111 may be greater than a pressure of the fracking fluid stream 113, and a pressure of the outgoing clean water stream 112 may be less than a pressure of the high pressure clean water stream 110.

The high pressure inlet port 123 and the high pressure outlet port 121 may be disposed at the high-pressure side of the pressure exchanger 100 with respect to the axis 132, and the low pressure inlet port 119 and the low pressure outlet port 124 may be disposed at the low-pressure side of the pressure exchanger with respect to the axis 132. The rotor 114 may rotate about the axis 132 in a direction from the high-pressure side to the low-pressure side as shown in the black downward arrow in FIG. 3A.

On the high-pressure side of the pressure exchanger 100, the high pressure clean water stream 110 can be introduced through the high pressure inlet port 123 and push onto the dead volume 115 in the rotor ducts 116 to thereby gradually displace the fracking fluid stream 111 through the high pressure outlet port 121. The rotor 114 can be configured to, based on rotation of the rotor 114, move the high pressure clean water stream 110 through some of the rotor ducts 116 in a direction from the end cover 122 toward the outer sealing area of the end cover 120.

In some implementations, the high pressure clean water stream 110 may include an additional flush volume 125 to prevent the proppant particles in the outgoing fracking fluid from being crushed between the end cover 120 and the rotor 114. For example, the flush volume 125 may overlap with or cover an edge area of the outer sealing area of the end cover 120 to separate the fracking fluid from the edge area of the outer sealing area of the end cover 120. Thus, the additional flush volume 125 may help to reduce wear on the end cover 120. In some examples, the flush volume 125 may be less than a volume of the fracking water discharged through the high pressure outlet port 121. For instance, the high pressure outlet port 121 can be configured to receive (i) a first volume of the fracking fluid from the low pressure inlet port 119 and (ii) a second volume (i.e., the flush volume 125) of clean fluid from the high pressure inlet port 123, where the second volume is less than the first volume.

The flush volume 125 may also attribute to the asymmetry of the dead volume 115 with respect to the axis 132. For example, the dead volume 115 may reach an outermost rotor duct 16 at the low-pressure side facing the low pressure inlet port 119 and the first end cover 120 in a radial direction of the rotor 114. On the other hand, the dead volume 115 may be spaced apart from an outermost rotor duct 16 at the high-pressure side facing the high pressure outlet port 121 and the first end cover 120 in the radial direction of the rotor 114.

On the low-pressure side of the pressure exchanger 100, the low pressure fracking fluid stream 113 can enter the rotor ducts 116 through the low pressure inlet port 119 and push onto the dead volume 115 to thereby gradually displace the clean water stream 112 through the low pressure outlet port 124. The low pressure fracking fluid stream 113 may move through some of the rotor ducts 116 from the end cover 120 toward the central sealing area 118 of the end cover 122.

In some examples, the pressure exchanger 100 may be configured to, based on rotation of the rotor 114 and the flow management techniques described above, control the low pressure fracking fluid stream 113 not to contact the central sealing area 118 of the end cover 122. In addition, the end cover 122 may not suffer from wear problems because the dead volume 115 blocks the fracking particles from being transferred to the clean water stream 112. That is, the clean water can pass both the central sealing area 118 and the outer sealing area of the end cover 122 without any crushing damage due to the fracking particles.

Figure 3B:
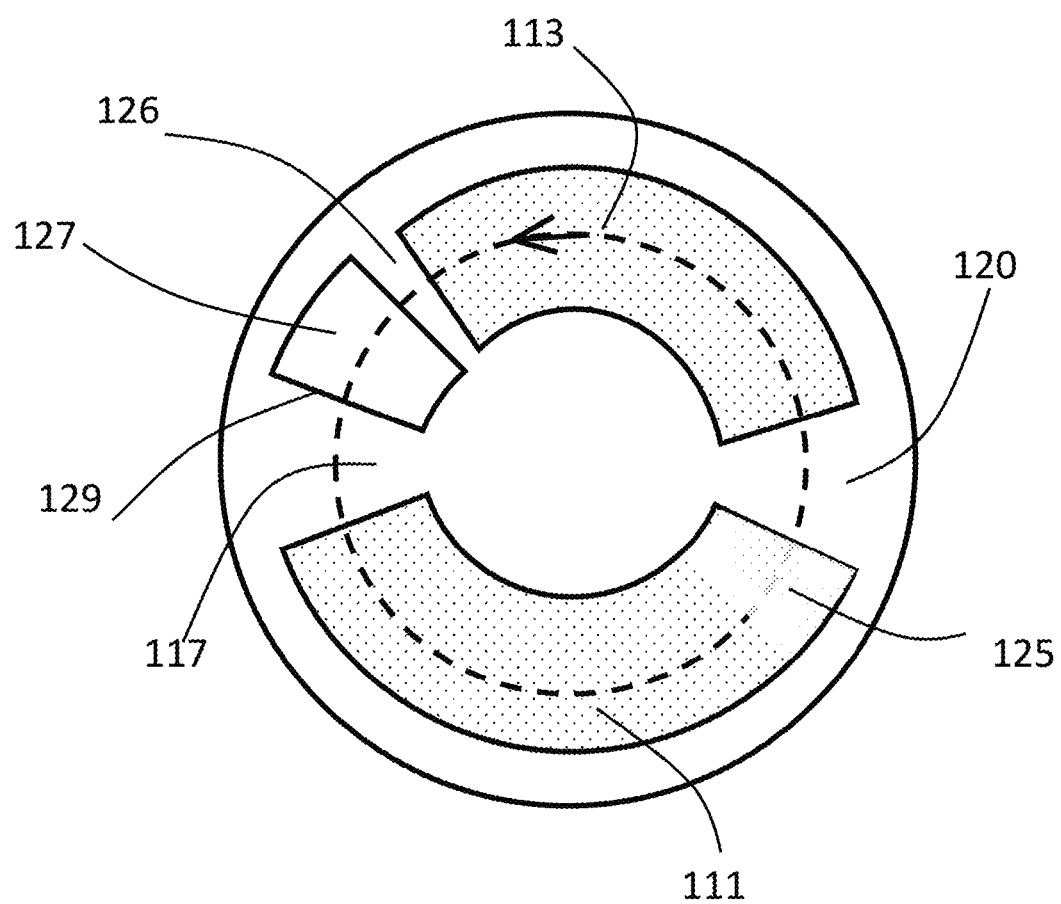
FIG. 3B is a cross-sectional view showing an example of an end cover including a flush port.

FIG. 3B is a cross-sectional view showing an example of an end cover including a flush port. The rotor 114 (see FIG. 3A) can rotate in the direction indicated with an arrow at the fracking fluid stream (i.e., low pressure port) 113 of the first end cover 120. The dotted circle in FIG. 3B represents the cylindrical cross-section at FIG. 3A.

In some implementations, as shown in FIG. 3B, the first end cover 120 can have high pressure port 111, low pressure port 113, and flush port 127 that extend in a circumferential direction about a center of the first end cover 120 and that also extend in a radial direction with respect to the center of the end cover 120. The low pressure port 113 can be spaced apart from the flush port 127 to thereby define the clearance gap 126, while the flush port 127 is in contact with the sealing area 117 or defines the thigh clearance 129. The high pressure port 111 can carry the additional flush volume 125.

Figure 4:
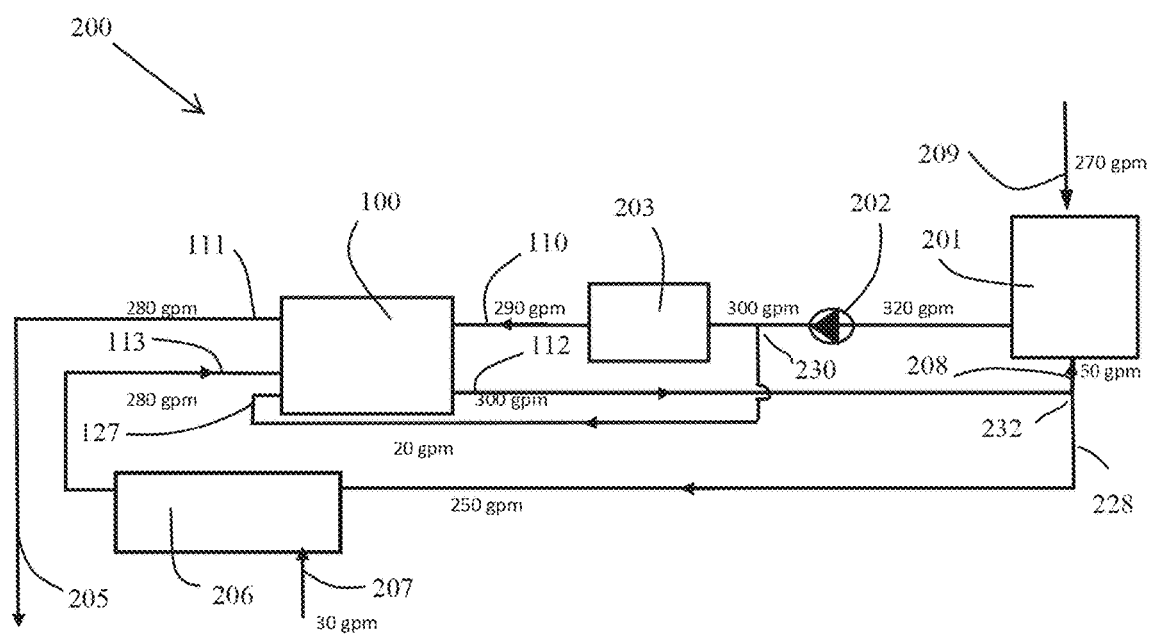
FIG. 4 is a block diagram showing an example system for hydraulic fracking using a pressure exchanger according to the present disclosure.

FIG. 4 illustrates a block diagram of an example system for hydraulic fracking using a pressure exchanger according to the present disclosure. For example, a system 200 includes the pressure exchanger 100 (see FIG. 3A) described above that includes the rotor 114. The pressure exchanger 100 is configured to supply the high pressure clean water stream 110, the low pressure fracking fluid stream 113, and a flushing volume of clean water through the flush port 127. In addition, the pressure exchanger 100 is configured to discharge the high pressure fracking fluid 111 and the low pressure clean water stream 112.

Specifically, as described above with regard to FIG. 3A, the pressure exchanger 100 includes the first end cover 120 disposed at the first side of the rotor 114, where the first end cover 120 defines a first pair of apertures configured to communicate the first fluid including the fracking particles, and the flush port 127 configured to receive the first portion of the second fluid in a state in which the first pair of apertures communicate the first fluid with the first side of the rotor 114. The flush volume of the second fluid supplied through the flush port 127 can help to prevent premature wear issues on the end cover 120 by separating the fracking fluid from a sealing area of the end cover 120.

The pressure exchanger 100 may further include the second end cover 122 disposed at the second side of the rotor 114, where the second end cover 122 defines a second pair of apertures. The second pair of apertures of the second end cover 122 are connected to the high pressure inlet port 123 and the low pressure outlet port 124 and configured to communicate the second fluid (e.g., water). In some implementations, the pressure exchanger 100 can be configured to, in a state in which the flush port 127 supplies the second fluid into the first side of the rotor 114, supply the additional flush volume 125 of the second fluid from the high pressure inlet port 123 to the high pressure outlet port 121 through an outer portion of the plurality of rotor ducts 116. The additional flush volume 125 may be less than a volume of the first fluid discharged through the high pressure outlet port 121.

The system 200 further includes a blender 206 configured to generate a first fluid (e.g., fracking fluid) including fracking particles and to supply the first fluid to the first side of the rotor 114. The system 200 further includes a water tank 201 configured to receive the second fluid (e.g., water). The water tank 201 is configured to supply a first portion of the second fluid to the first side of the rotor 114 (e.g., the high pressure clean water stream 110) and a second portion of the second fluid to the second side of the rotor 114 through the flush port 127. A first flow rate of the first portion of the second fluid can be much greater than a second flow rate of the second portion of the second fluid. For example, the second flow rate (e.g., 20 gpm) can be 5 to 10% of the first flow rate (e.g., 290 gpm).

The system 200 may further include a feed pump 202 connected to the water tank 201, and a high-pressure pump 203 connected to the feed pump 202 and configured to supply water to the pressure exchanger 100. The system 200 may further include a plurality of pipes that connect components of the system 200 and that are configured to carry water or fracking fluid. Accordingly, the reference numerals in FIG. 4 may refer to pipes and ports as well as the fluid carried by the pipes or ports.

In some implementations, as shown in the system 200, the pressure exchanger 100 may operate to output 280 gpm of the high pressure fracking fluid stream 111. The high pressure fracking fluid stream 111 may be guided through a discharge pipe 205 and provided to a fracking operation to develop an oil or gas well, or for some other operations such as slurry transportation. The output flow rates of the pressure exchanger 100 shown in FIG. 4, e.g., 280 gpm of the fracking fluid and 300 gpm of water, are just examples for explanation of the system 200, and the output flow rates may vary in other examples.

The water tank 201 may receive (i) 270 gpm of water from an external water supply through a feed line or pipe 209 and (ii) 30 gpm of water from the pressure exchanger 100 through another feed line or pipe 208. The water tank 201 may output 320 gpm of water, and deliver an outflow of 300 gpm via the feed pump 202 to the high-pressure pump 203. The high-pressure pump 203 may operate at a relatively high pressure, for example, 15,000 psi, and discharge water with a less flow rate (e.g., 290 gpm) due to volumetric compression under the high pressure. The high-pressure pump 203 may supply the high pressure clean water stream 110 to the pressure exchanger 100. In some examples, each of the feed pump 202 and the high-pressure pump 203 may include a motor.

The blender or pump 206 may receive and mix some of the low pressure water stream 112 discharged from the pressure exchanger 100 and proppant particles or fracking chemicals through a feed line 207 to generate the fracking fluid. For example, the blender 6 may receive and mix (i) 250 gpm of water out of 300 gpm of the low pressure clean water stream 112 and (ii) 30 gpm of proppants. The blender 6 may discharge about 280 gpm of the low pressure fracking fluid stream 113 to the pressure exchanger 100. The flow rate, 30 gpm, of the proppants or fracking chemicals into the blender 206 may be equal to the flow rate of water fed back from the low pressure clean water stream 112 to the water tank 201 through the pipe 208.

In some implementations, the system 200 may further include a branch pipe 230 that is connected to the feed pump 202, the high-pressure pump 203, and the flush port 127 of the pressure exchanger 100. For example, the branch pipe 230 may be configured to divide the second fluid (e.g., 320 gpm) received from the feed pump 202 into the first portion (e.g., 300 gpm) to be supplied to the high-pressure pump 203 and the second portion (e.g., 20 gpm) of the second fluid to be supplied to the flush port 127.

In some implementations, the system 200 may further include a connector 232 that branches the low pressure clean water stream 112 to supply water to the water tank 201 and the blender 206. For example, the connector 232 is configured to divide water (e.g., 300 gpm) from the low pressure clean water stream 112 into a third portion and a fourth portion of water and to supply the third and fourth portions of water to the water tank 201 and the blender 206, respectively. In some examples, a third flow rate (e.g., 30 gpm) of the third portion of water may be fed back to the water tank 201 through the pipe 208. In addition, a fourth flow rate (e.g., 250 gpm) of the fourth portion of water may be supplied to the blender 206 through a pipe 228. That is, the flow rate of water supplied to the blender 206 may be much greater than the flow rate of water fed back to the water tank 201. For example, the third flow rate may be about 10 to 20% of the fourth flow rate.

In some examples, the input flow rate and the output flow rate of the pressure exchanger 100 may not exactly match each other due to compression of fluid or integral leakage of water in the pressure exchanger 100. For example, the pressure exchanger 100 may receive more fracking fluid or water than a target output flow rate (e.g., 280 gpm) considering loss of water due to the internal leakage. In some cases, the leakage water may be discharged with the low pressure clean water stream 112. For instance, FIG. 4 illustrates that 290 gpm of the output flow rate of the high pressure clean water stream 110 increases to 300 gpm of the low pressure clean water stream 112 due to the leakage inflow of water.

All examples described herein are merely to describe the present disclosure in greater detail. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

What is claimed is:

1. A pressure exchanger for hydraulic fracking, the pressure exchanger comprising:
a rotor configured to rotate about an axis, the rotor defining a plurality of rotor ducts extending parallel to the axis, each rotor duct extending between a first side and a second side of the rotor that are spaced apart from each other;
a first end cover disposed at the first side of the rotor, the first end cover defining a first pair of apertures that are configured to communicate a first fluid including fracking particles with the rotor and include a first inlet port and a first outlet port; and
a second end cover disposed at the second side of the rotor, the second end cover defining a second pair of apertures that are configured to communicate a second fluid with the rotor and include a second inlet port and a second outlet port,
wherein the first end cover further defines a flush port configured to supply the second fluid into the first side of the rotor after the first inlet port communicates the first fluid with the rotor.

2. The pressure exchanger of claim 1, wherein the flush port is spaced apart from the first side of the rotor and defines a clearance gap between the first side of the rotor and an end of the flush port facing the first side of the rotor.

3. The pressure exchanger of claim 2, wherein a size of the clearance gap is greater than a maximum size of the fracking particles.

4. The pressure exchanger of claim 2, wherein the first end cover comprises a sealing area that faces the first side of the rotor and that is disposed between the first pair of apertures, wherein the axis passes through the sealing area, and
wherein the flush port is defined between the sealing area and the first inlet port, the flush port being in communication with the first inlet port.

5. The pressure exchanger of claim 4, wherein the flush port is configured to supply the second fluid into the first side of the rotor such that the second fluid separates the first fluid from the sealing area.

6. The pressure exchanger of claim 2, wherein the first pair of apertures comprise:
the first inlet port being a low pressure inlet configured to introduce, to the rotor, the first fluid having a first low pressure, the low pressure inlet being in communication with the flush port; and the first outlet port being a high pressure outlet configured to discharge, from the rotor, the first fluid having a first high pressure greater than the first low pressure, and wherein the second pair of apertures comprise:
- the second inlet port being a high pressure inlet that faces the high pressure outlet and that is configured to introduce, to the rotor, the second fluid having a second high pressure, and
- the second outlet port being a low pressure outlet that faces the low pressure inlet and that is configured to discharge, from the rotor, the second fluid having a second low pressure less than the second high pressure.

7. The pressure exchanger of claim 6, wherein the first end cover comprises:
- a center sealing area that is disposed between the low pressure inlet and the high pressure outlet and that faces a center portion of the first side of the rotor, the axis passing through the center sealing area; and
- an outer sealing area that faces an outer portion of the first side of the rotor, the outer sealing area facing each of the high pressure inlet and the low pressure outlet, and
- wherein the flush port is defined between the center sealing area and the low pressure inlet, the flush port being configured to supply the second fluid into the first side of the rotor such that the second fluid separates the first fluid from the center sealing area.

8. The pressure exchanger of claim 7, wherein the high pressure inlet is configured to supply at least a portion of the second fluid to the high pressure outlet through the rotor such that the second fluid separates the first fluid from the outer sealing area.

9. The pressure exchanger of claim 8, wherein the high pressure outlet is configured to receive (i) a first volume of the first fluid from the low pressure inlet and (ii) a second volume of the second fluid from the high pressure inlet, the second volume being less than the first volume.

10. The pressure exchanger of claim 7, wherein the rotor is configured to, in a state in which the flush port supplies the second fluid into the first side of the rotor, supply an additional flush volume of the second fluid from the high pressure inlet to the high pressure outlet through an outer portion of the plurality of rotor ducts, and
- wherein the additional flush volume is less than a volume of the first fluid discharged through the high pressure outlet.

11. The pressure exchanger of claim 1, wherein the rotor has a low pressure side and a high pressure side, the axis passing through an area between the low pressure side and the high pressure side,
- wherein one of the first pair of apertures and the flush port are defined at the low pressure side, and the other of the first pair of apertures is defined at the high pressure side,
- wherein one of the second pair of apertures is defined at the low pressure side and faces each of the flush port and the one of the first pair of apertures, and
- wherein a cross-sectional area of the one of the second pair of apertures defined at the low pressure side is greater than a cross-sectional area of the other of the second pair of apertures defined at the high pressure side.

* * * * *